J. L. SMITH.
Sheep-Shears.
No. 159,362. Patented Feb. 2, 1875.
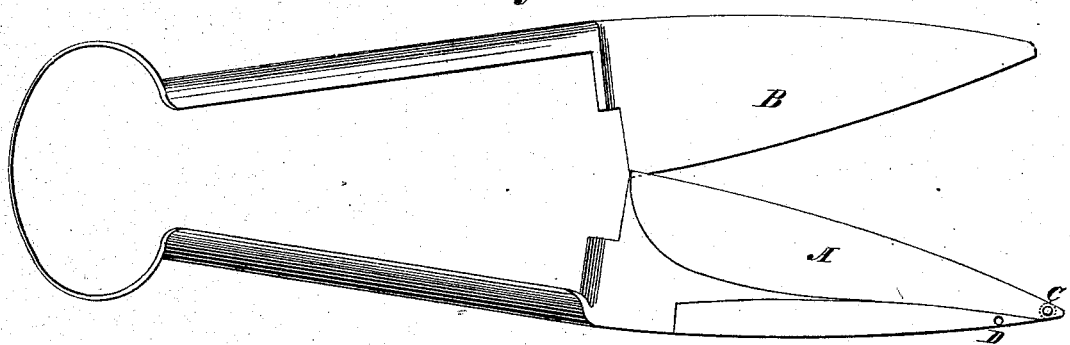

UNITED STATES PATENT OFFICE.

JAMES L. SMITH, OF TUSCOLA, ILLINOIS.

IMPROVEMENT IN SHEEP-SHEARS.

Specification forming part of Letters Patent No. 159,362, dated February 2, 1875; application filed January 4, 1875.

*To all whom it may concern:*

Be it known that I, JAMES L. SMITH, of Tuscola, in the county of Douglas and State of Illinois, have invented a new and useful Improvement in Shears, of which the following is a specification:

This invention consists in a guard placed on the inside near the point of one of the blades of a shears, to shield the skin and guide the shears in the operation of shearing sheep or other animals.

In the accompanying drawing, Figure 1 is a face or top view of a sheep-shears, showing the blades open. Fig. 2 is an edge view of the same.

Similar letters of reference indicate corresponding parts.

A and B represent the blades of the shears. C is the "guard." This guard is a small hemisphere, or half-globe, attached to the upper blade near the point by means of a rivet or screw, or in any other suitable manner, to serve as a guard to guide the shears and protect the skin of the animal being sheared. This guard is preferably made of metal, as brass, iron, or steel; but it may be made of any material, and of any shape or form suitable for the purpose. The lower blade, B, it will be seen, is made shorter than the blade A, which allows it to close in just back of the guard, and so that it may cut up to the guard. D is a hole through the blade, (there may be more than one hole,) which allows the guard to be moved as the blade is worn away by grinding; but the guard may be made without a stem, and be attached by means of brazing, solder, or cement. This guard will prevent the shears cutting or in any manner injuring the skin, thereby preventing soreness, and consequent injury to the animal. It enables the shearer to shear closer to the skin, and to do at least one-third more work in a given time than he could do without it.

Having thus described my invention, I claim as new and desire to secure by Letters Patent—

1. A guard near the point of one of the blades of shears for shearing animals, substantially as seen at C, for the purposes specified.

2. One or more holes, D, in one of the blades of the shears above described, for the purposes set forth.

3. In combination with the guard C, the short blade B, as and for the purposes described.

JAMES L. SMITH.

Witnesses:
  H. B. MADISON,
  P. L. DAWSON.